Oct. 31, 1967    R. E. STEWART ET AL    3,350,042
CORRUGATED RESILIENT MOUNT

Filed Oct. 11, 1965    2 Sheets-Sheet 1

INVENTORS
ROSS E. STEWART
ROBERT T. DRAKE

ATTORNEY

United States Patent Office 3,350,042
Patented Oct. 31, 1967

3,350,042
CORRUGATED RESILIENT MOUNT
Ross E. Stewart, Norwalk, Ohio, and Robert T. Drake, Orchard Lake, Mich., assignors to Clevite Corporation, a corporation of Ohio
Filed Oct. 11, 1965, Ser. No. 494,412
10 Claims. (Cl. 248—22)

ABSTRACT OF THE DISCLOSURE

A tubular rubber bushing having a radical flange at one end for bearing against a support, and a rigid spacer sleeve within the axial opening. The axial dimension of the sleeve being less than the length of the bushing body thereby providing a rubber skirt. The circumferential periphery of the bushing between the flange and the skirt being corrugated and in engagement with the supported structure.

---

Figure 1:
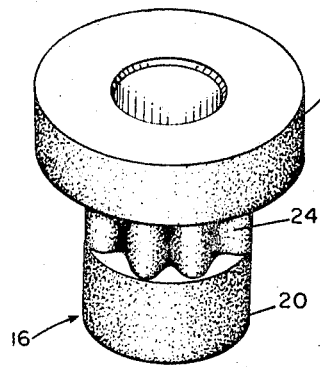

This invention relates generally to a rubber bushing and more particularly to a corrugated resilient mount adapted to be employed to isolate vibration of mounted objects.

The device is accordance with this invention functions, in normal use, as a vibration isolator, for example, between the base of an electric motor and the support brackets therefor. Other uses, for instance in the automotive and textile machinery fields, are readily apparent to those skilled in the art. Mountings of this general category are known; for instance, see United States Patent No. 2,828,095.

The instant invention is directed toward an improvement of such mountings as generally illustrated in the above noted patent. For many applications it is desirable to reduce or completely eliminate low frequency vibrations. Normally the type of mount here under consideration has an inherent, undesirable, stiffness in the radial and axial directions. Such stiffness results in transfer of low frequency vibrations. The mount in accordance with this invention reduces the vibration by varying the rubber spring rate in the critical areas. Portions of the rubber forming the mount are displaced from a critical to a non-critical area. This deflection, or bulging, of the rubber effects dampening of the vibrations by absorbing some of the vibration and thereafter by compressing only a reduced amount of energy during the displacement of the rubber in the critical area. The over-all effect of such deflection is to provide a softer impact upon the supported bracket.

It is, therefore, the primary object of this invention to provide an improved resilient mounting.

It is another object of this invention to provide a resilient mounting with corrugated portions to lower the frequency of vibrations when a load is applied upon the mounting in an axial or radial direction, or somewhere therebetween.

It is a still further and more specific object of this invention to provide a corrugated resilient mount which does not require a critical alignment of the supported structure relative to the corrugated portion of the mount.

It is another object of this invention to provide a corrugated resilient mount which can be readily manufactured and, more specifically, taken out of a rubber mold without difficulty or intricate techniques.

An aspect of the present invention resides in the provision of a corrugated resilient mounting which extends through aligned apertures in spaced supported and support structures. More specifically, the device is composed of a tubular body of resilient material which at one end thereof has a radially projecting flange disposed in bearing relation upon the adjacent surface of the support structure and has at the other end a tubular extension or skirt. This resilient body provides between its ends a corrugated portion which is composed of a plurality of rounded ribs. This corrugated portion has a maximum diameter substantially not greater than the diameter of the above noted apertures and a minimum diameter which is at least sufficient for maintaining structural integrity of the tubular body. A tubular spacer, in sleeve form, of substantially rigid material is concentrically secured within the body spaced from the terminal end of the tubular extension. A bolt extends through the apertures and the tubular sleeves and, finally, securing means such as a nut and a washer are associated with the bolt for axially squeezing the ends of the resilient body to radially expand the skirt to provide a rebound snubber element.

For a better understanding of the present invention, together with other and further objects thereof, reference is had to the following description taken in connection with the accompanying drawings, and its scope will be pointed out in the appended claims.

Figure 2:
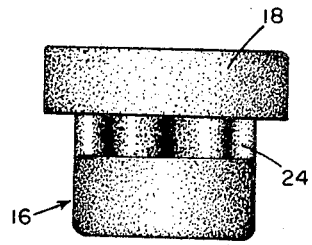
Figure 3:
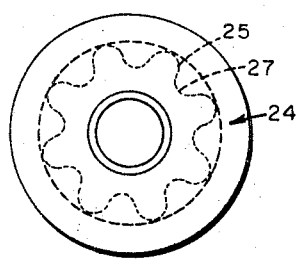
Figure 4:
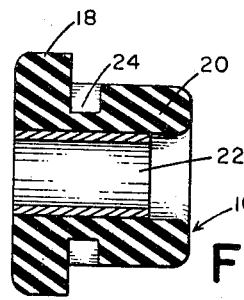
Figure 6:
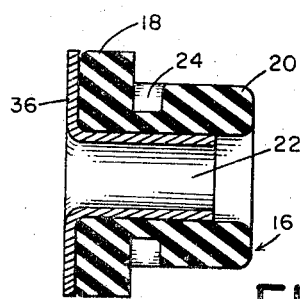
Figure 5:
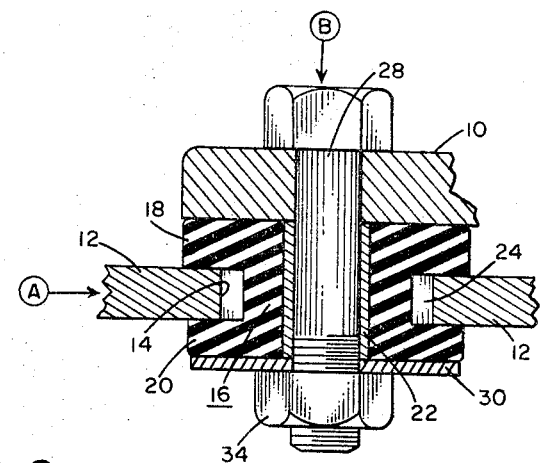
Figure 7:
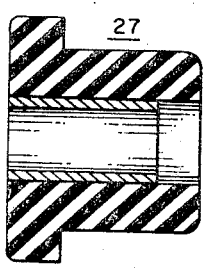
Figure 10:
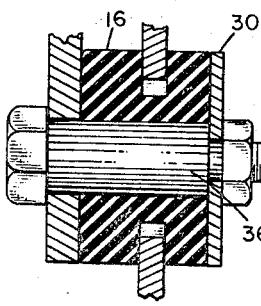
Figure 8:
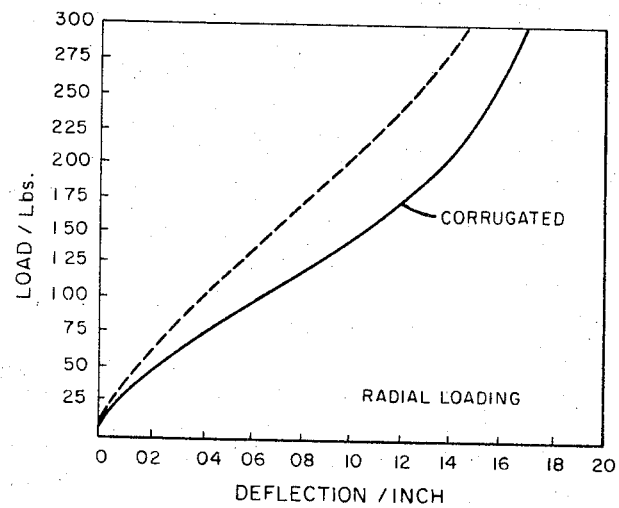
Figure 9:
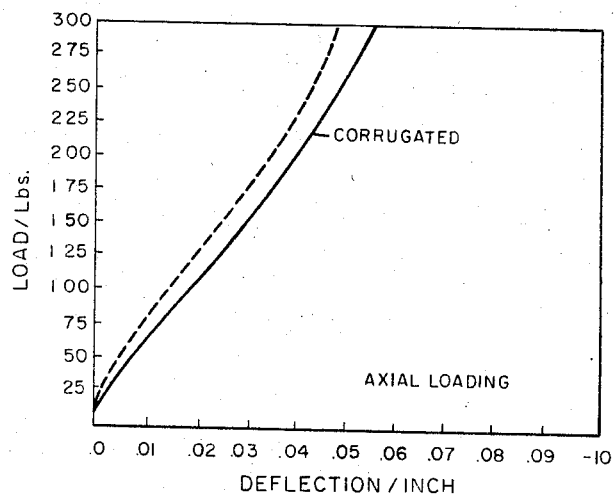

In the drawing:
FIGURE 1 is a perspective view of the resilient mount in accordance with this invention;
FIGURE 2 is a side view of the mount shown in FIGURE 1;
FIGURE 3 is a top view of the mount shown in FIGURE 1 and indicating in outline form the ribbed portion of the mount;
FIGURE 4 is a longitudinal cross-sectional view of the mount shown in the preceding figures;
FIGURE 5 is a view similar to FIGURE 4 showing the mount assembled together with a support and supporting structures;
FIGURE 6 is a view similar to FIGURE 4 showing a modification of the spacer element;
FIGURE 7 is a view similar to FIGURE 4 showing a mount in accordance with the prior art;
FIGURES 8 and 9 are each a diagrammatic presentation of specific load characteristics of the mount in accordance with the invention; and
FIGURE 10 is a view similar to FIGURE 5 showing still another modification of this invention.

Turning now to the drawing and specifically referring to FIGURES 1 through 5, there is shown a support structure 10 and in spaced relation thereto a supported structure 12 provided with axially aligned apertures 14. The terms "support" and "supported" structure is used and singularly applied herein merely for ease of description, although a reversal of these parts is contemplated within the scope of this invention. The aperture 14 in supported structure 12, e.g. for a motor, is dimensioned to receive therein the elongated portion of a tubular body 16 composed of a resilient elastomeric material, such as rubber, and having at the upper end thereof a radially projecting flange 18 which bears upon and is disposed between the adjacent surfaces of the support bracket 12 and the support structure 10. The radial dimension of the flange 18 is greater than the corresponding radial dimension of the aperture 14 to provide a suitable seat and cushion for the mount between the structures. The lower end of the body 16 constitutes a tubular extension or skirt 20.

Concentrically secured within the central aperture of the tubular body, by means of an interference fit, is a tubular spacer sleeve 22 of substantially rigid material such as metal or plastic-like materials. At the upper end, the spacer sleeve terminates flush with the end face of the flange 18; at the opposite end the terminal point of the sleeve is spaced substantially from the end face of the skirt 20 for reasons which will hereafter become apparent.

The tubular body 16 is composed between its ends of an annular corrugated or ribbed portion 24 with a maximum diameter which is substantially not greater than the diameter of aperture 14 and a minimum diameter suitable to satisfy the requirements for maintaining structural integrity of the tubular body 16.

As is particularly evident from FIGURES 1 and 2, the corrugated portion 24 is composed of a continuous series of rounded ribs 25 arranged in circular array about the center axis of the device. In the preferred embodiment the ribs 25 are rounded at the peripheral edge. In a broader sense, the corrugated portion 24 defines a plurality of circumferentially located, axially extending, grooves which in the preferred embodiment have a circular curvature. Consequently, the axis of elongation of each rib is parallel to each other and parallel to the central axis of the body. The radius and radial extremity of each rounded rib is adapted to provide maximum load deflecting contact with the adjacent surface of the supported structure 12. The axial length of the corrugated portion is substantially equal to the thickness of the supported structure.

One advantage of arranging the ribs with the axis of elongation parallel to the central axis as compared to arranging the ribs circumferentially (in O-ring form), is that this arrangement obviates the need for aligning the ribs with respect to the supported bracket. Moreover, this preferred form of the invention makes it possible to remove the rubber body, which is normally molded, out of the mold much more readily than is otherwise possible.

The assembly of the device is completed by inserting into the apertures of structure 10 and spacer 22 a partly threaded bolt 28 and by fastening to the lower threaded end portion thereof a metal washer 30 sufficiently large to give snubbing action and a nut 34. By tightening the nut 34 on bolt 28 the washer is caused to move axially upward, thereby radially expanding the skirt 20 of the body 16 until the metal washer 30 abuts the spacer 22 at which time the skirt has been formed into a compressed rebound snubber. The snubber is held in a restrained condition by the various interacting rigid parts.

Upon the application of a radial load in the direction of the arrow designated A, see FIG. 5, the affected ribs will bulge and be deflected thereby displacing a certain amount of rubber. The adjacent grooves 27 will permit the rubber to move therein, allowing the part to absorb vibrations at a lower rate. The same effect takes place, although to a somewhat lesser degree, when an axial load is applied upon the device, see arrow designated B. Again the rubber, this time from the flange portion 18, will be caused to flow into one or more of the grooves 27 of the corrugated portion 24. This flow of rubber will occur to a more or lesser degree when a load is applied to the device in a direction other than the ones heretofore mentioned.

The significant improvement of the invention is exemplified in diagrams, FIGURES 8 and 9, in which the solid line represents a tested mount in accordance with this invention, and the dashed line a mount 27 in accordance with the prior art such as shown in FIGURE 7. More specifically referring now to FIGURE 8, the test data compares radial or normally horizontal loading of a corrugated device relative to an uncorrugated mount. For instance in one size of a corrugated mount a radially applied load of about 140 pounds will cause a deflection of $\frac{1}{10}$-inch. In the uncorrugated mount of some material a $\frac{1}{10}$-inch deflection is established by a radial load of approximately 200 pounds.

Similarly advantageous test results were obtained with respect to normally vertical or axial loading, see FIGURE 9. For a deflection of .04″ for the corrugated mount an axial average load was shown to be approximately 200 pounds, whereas at the same point of deflection for the uncorrugated mount the average axial load was already approximately 235 pounds.

In a further modification of this invention, the tubular spacer 22 is shown in FIGURE 6 with a radial flange 36 at one end which allows other means of orientation of mount to support and supported structures or offers a more rigid assembly where desired.

FIGURE 10 shows a further modification of the present invention. More particularly, this embodiment illustrates that the rubber body 16 may be utilized without a rigid sleeve such as shown in FIGURE 5, see 22. The desired limits for compressing the tubular body 16 are obtained by a shoulder bolt 36.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A corrugated resilient mounting securing together spaced support and supported structures having aligned apertures, comprising: a tubular body of resilient material extending through the aperture of said supported structure and having at one end thereof a radially projecting flange disposed in bearing relation to the adjacent surface of the support structure and at the other end a tubular extension, said body having a substantially uniform inside diameter and providing between its ends a circumferentially corrugated portion having a plurality of peripherally located axially extending grooves, said portion having a maximum diameter substantially not greater than the diameter of said apertures and a minimum diameter sufficient for at least maintaining structural continuity, a bolt extending through said apertures, and securing means associated with said bolt for axially squeezing the ends of the resilient body to radially expand said extension to provide a rebound snubber element.

2. A resilient mounting according to claim 1, wherein the curvature of said grooves is substantially circular.

3. A resilient mounting according to claim 2, wherein the corrugated portion of said body is provided with a continuous series of parallel arranged grooves.

4. A corrugated resilient mounting securing together spaced support and supported structures having aligned apertures, comprising: a tubular body of resilient material extending through the aperture of said supported structure and having at one end thereof a radially projecting flange disposed in bearing relation to the adjacent surface of the support structure and at the other end a tubular extension, said body having a substantially uniform inside diameter and providing between its ends a corrugated portion composed of a plurality of radially and axially extending ribs, said portion having a maximum diameter substantially not greater than the diameter of said apertures and a minimum diameter sufficient for at least maintaining structural continuity, a tubular spacer sleeve of substantially rigid material concentrically secured within said body spaced from the terminal end of said tubular extension, a bolt extending through said apertures and said tubular sleeve, and securing means associated with said bolt for axially squeezing the ends of the resilient body to radially expand said extension to provide a rebound snubber element.

5. A resilient mounting according to claim 4, wherein said ribs are circumferentially equally distributed.

6. A resilient mounting according to claim 4, wherein the axial length of said corrugated portion is substantially equal the thickness of the supported structure.

7. A resilient mounting according to claim 4, wherein the outer surfaces of said ribs are rounded and the rounded curvature is elongated and extends parallel to the longitudinal axis of the body.

8. A resilient mounting according to claim 7, wherein the outer radial extremity of each rounded rib is adapted for load deflecting contact with the adjacent surface of the supported structure.

9. A resilient mounting according to claim 4, wherein said tubular spacer is radially flanged at one end.

10. A resilient mounting according to claim 4, wherein the tubular body of resilient material is of substantially uniform diameter except for the corrugated and flanged portion.

References Cited

UNITED STATES PATENTS

| | | | |
|---|---|---|---|
| 2,386,463 | 10/1945 | Hile | 248—358 |
| 2,828,095 | 3/1958 | Beck et al. | 248—9 |

ROY D. FRAZIER, *Primary Examiner.*

F. DOMOTOR, *Assistant Examiner.*